Dec. 10, 1946.  J. G. OETZEL,  2,412,228
APPARATUS FOR REGULATING VEHICLE SPEED
Filed Jan. 26, 1944  2 Sheets-Sheet 1

INVENTOR
John George Oetzel
BY
ATTORNEYS

Dec. 10, 1946.  J. G. OETZEL  2,412,228
APPARATUS FOR REGULATING VEHICLE SPEED
Filed Jan. 26, 1944  2 Sheets-Sheet 2
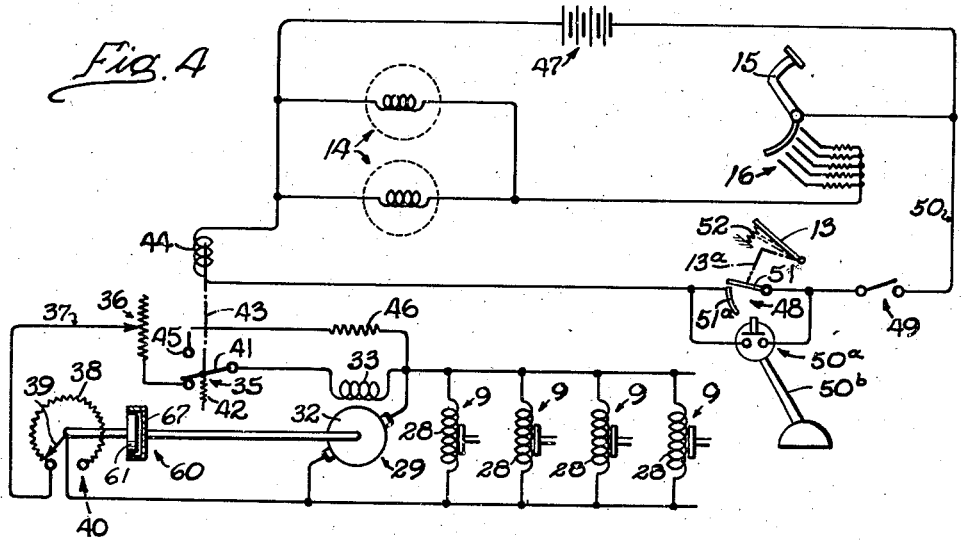
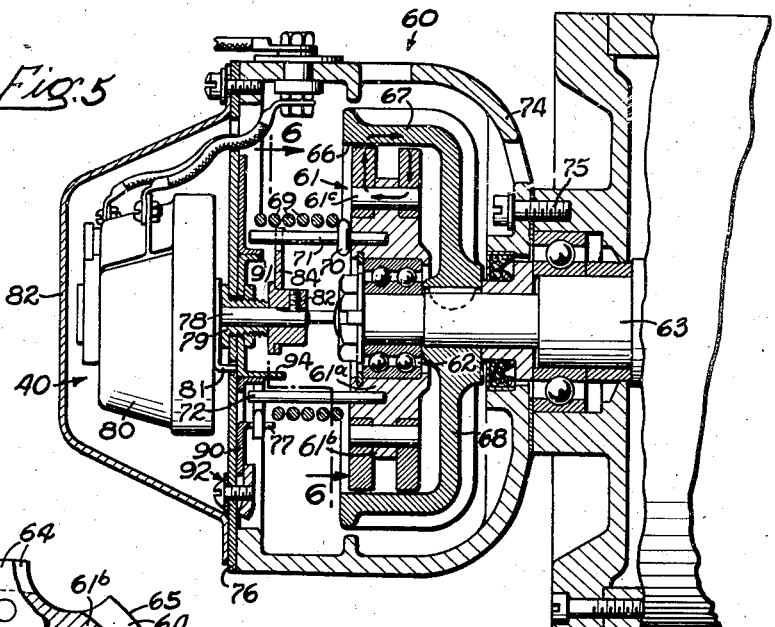
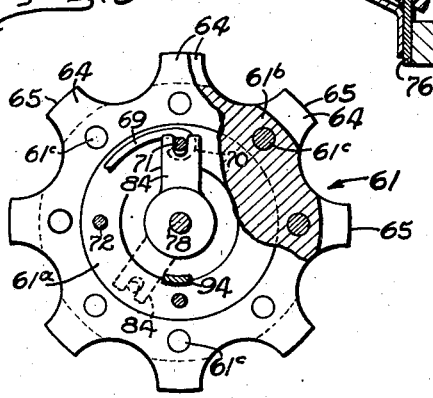
INVENTOR
John George Oetzel
By Carlton, Pitzner, Hubbard. Wolfe
ATTORNEYS Patented Dec. 10, 1946

2,412,228

UNITED STATES PATENT OFFICE 2,412,228

APPARATUS FOR REGULATING VEHICLE SPEED

John George Oetzel, Beloit, Wis., assignor to Warner Electric Brake Manufacturing Company, South Beloit, Ill., a corporation of Illinois Application January 26, 1944, Serial No. 519,726

8 Claims. (Cl. 192—3)

This invention relates to the retarding of vehicles, particularly heavy automotive vehicles, and the general object is to provide an auxiliary braking system which operates automatically and in a novel manner to reduce the burden on the main brakes.

Another object is to provide a novel method of controlling the energization of an auxiliary frictionless type of vehicle brake whereby to maintain the latter at optimum effectiveness at different operating speeds.

A more detailed object is to provide a brake of the frictionless type which is operable effectively at comparatively low vehicle speeds and which may be controlled automatically as an incident to a manipulation, such as operation of the accelerator, naturally occurring in the normal use of the vehicle at a time when it is desirable to impose a retarding force.

Another object is to provide a frictionless braking system, the effectiveness of which varies with the vehicle speed and degree of electrical energization together with means for varying the energization automatically so that the system may operate substantially at optimum effectiveness over a substantial speed range.

The invention also resides in the novel character of the means for controlling the brake energization.

Other objects and advantages of the invention will become apparent from the following detailed description taken in connection with the accompanying drawings, in which Figure 1 is a plan view of the wheel and axle assemblies and the power plant of an automotive vehicle equipped with a braking system embodying the present invention.

Fig. 4 is a schematic view and wiring diagram of the automatic brake control.

Fig. 5 is a section taken along the line 5—5 of Fig. 1.

Fig. 6 is a sectional view taken substantially along the line 6—6 of Fig. 5.

Figure 1:
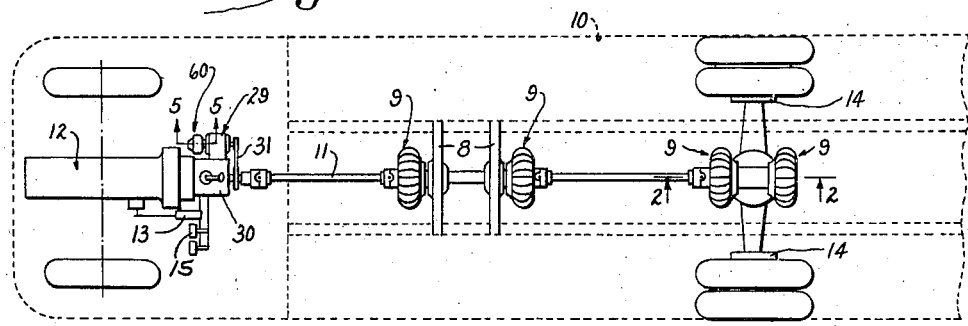

For purposes of illustration, the invention has been shown in the drawings as applied to the control of auxiliary brakes 9 on a heavy automotive vehicle 10 driven through the usual propeller shaft 11 by a prime mover such as an internal combustion engine 12 which operates at varying speeds depending, among other things, on the position of a manually adjustable speed controller such as an accelerator pedal 13. The vehicle is also equipped with independently acting main brakes 14 which may be actuated electrically and controlled manually by depression of a foot pedal 15 actuating a rheostat controller 16.

The present invention contemplates a novel method of controlling the auxiliary or frictionless brake above described so as to approach optimum effectiveness in retarding the vehicle over a substantial range of the speeds at which braking may be required in service operation of the vehicle. The method includes the steps of energizing the auxiliary brake automatically as an incident to retraction of the vehicle controller to a low speed position, and varying the degree of such energization automatically with the prevailing vehicle speed so as to maintain greater energization at low speeds than at relatively higher speed. As a result, the auxiliary brake, which necessarily is relatively bulky considering its available output, may be utilized very effectively at low vehicle speeds without danger of being damaged by overheating at high speeds. A substantially greater part of the total braking burden may thus be assumed by the auxiliary system with a resultant reduction in the frictional wear on the main or friction braking system.

Figure 2:
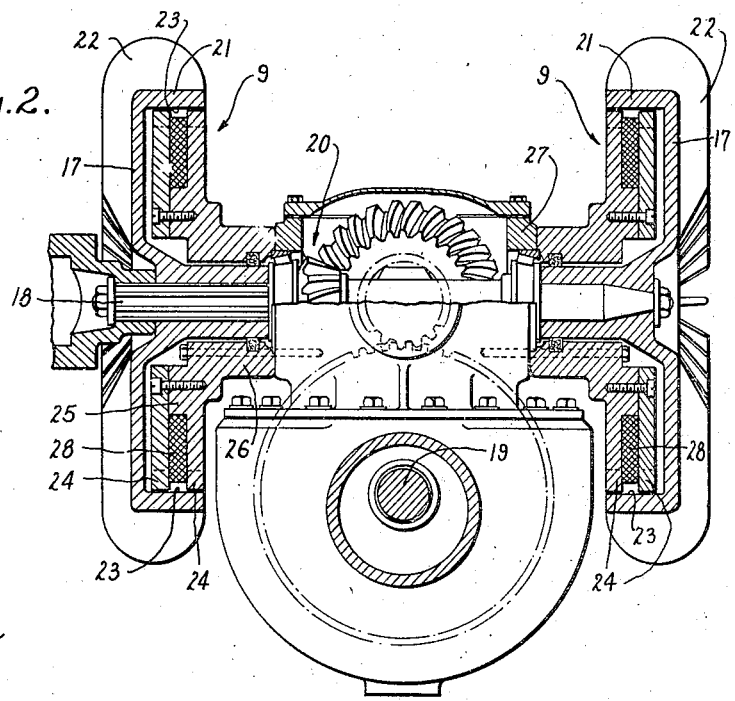
Fig. 2 is a section taken along the line 2—2 of Fig. 1.

The vehicle 10 is equipped with four eddy current brakes 9, two at the rear end of the propeller shaft and two intermediate the shaft ends with their stationary elements mounted on a cross member 8 of the vehicle frame. The number and location of the auxiliary brakes will, of course, depend on the kind of vehicle, the location of the prime mover, etc. The brakes 9 are of the same general construction, that of the rear units being shown in Fig. 2. Each includes a plate 17 having a cylindrical flange or drum 21 fast on one end of the shaft 18 which is journaled in the rear axle housing about the axle 19 and coupled at its forward end to the propeller shaft. The axle is driven through bevel gearing 20 so that the shaft 18 is disposed above the axle permitting the drum 21 to be of substantial diameter. The drum and the plate are composed of cast iron or the like and formed with heat radiating fins 22.

The internal drum surface 23 is smooth and is disposed close to the outwardly facing poles 24 of a magnet ring 25 whose hub 26 is bolted to the gear housing 27. An annular winding 28 is disposed between the poles which may, if desired, be constructed with annularly spaced teeth. When the winding is energized, magnetic flux threads the circuit around the winding including the drum or inductor 21 creating eddy currents in the latter. Since the magnet is stationary, a retarding effect is thus exerted on the drum and, therefore, on the vehicle axle, the magnitude of this force being proportional to the vehicle speed and also to the energizing current.

While current for exciting the eddy current windings 28 may be derived from a storage battery or the like, it is preferred to employ a separate electric generator 29 which may be mounted on the side of the transmission case 30 and driven as by a belt 31 from the propeller shaft. As shown, the generator is of the shunt type having opposite terminals of its rotor 32 connected to the brake windings 28 and a stator with a field winding 33 adapted to be connected in parallel with the rotor when current is to be delivered.

In the present instance, the circuit for the generator field includes in series relation a switch 35, a manually adjustable rheostat 36, a conductor 37 leading to one terminal of a resistance element 38 which coacts with a wiper arm 39 leading to the other rotor terminal. Thus, when the switch 35 is closed and the vehicle is in motion, the output of the generator and therefore the degree of energization of the brake windings 28 will be determined by the setting of the rheostat 36 and the position of the arm 39 which cooperates with the resistance element 38 to form a second rheostat or voltage controller 40 which may be of standard construction.

Figure 3:
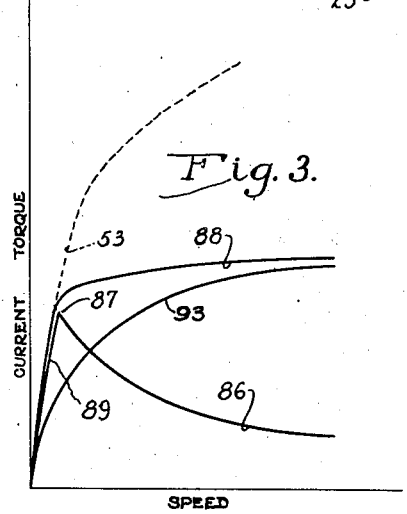
Fig. 3 shows curves illustrating the electrical characteristics of certain of the control parts.

In accordance with the present invention, the brake windings 28 are energized automatically as an incident to retraction of the speed controller or accelerator 13 to low speed position. For this purpose, the movable contact 41 of the switch 35 is urged by a spring 42 to switch closing position as shown in Fig. 3 and is connected to the armature 43 of a solenoid 44 so as to open the switch 35 when the solenoid is energized. As an incident to this latter motion, the contact 41 engages a contact 45 to connect a discharge resistance 46 in series with the generator field winding 33 and thereby insure complete disabling of the generator.

One terminal of the solenoid 44 is connected to the vehicle storage battery 47 and the other terminal is connected through a switch 48, the vehicle ignition switch 49, and a conductor 50 to the other battery terminal. The movable contact 51 of the switch 48 is connected through suitable linkage 13a to the accelerator pedal 13 so as to be disposed in open position as shown when the accelerator pedal is released and held by a spring 52 in the low speed idling position. Immediately upon the initial depression of the pedal to speed up the engine 12, the switch 48 is closed and remains closed at all higher speed positions of the accelerator pedal 13, one of which is shown in dotted outline in Fig. 4. This may be accomplished by providing for yielding of the switch contacts 51a after the initial engagement with the contact 51. Thus, when the vehicle is in motion with the ignition switch closed, the solenoid 44 will remain energized, the generator will be disabled, and the eddy current brakes will be maintained inactive in all positions of the accelerator pedal except the low speed or released position. However, when the accelerator pedal is released and the switch 48 is thereby opened, the solenoid will be deenergized whereupon the switch 35 will close automatically to render the generator operative to deliver current to the windings 28 and produce a force retarding coasting of the vehicle. If it is desired at any time to permit the vehicle to coast freely with the accelerator released, the driver may depress a button and close a switch 50a preferably located on the usual gear shift lever 50b. This switch is in parallel with the switch 48 so as to maintain the solenoid 44 energized and the eddy current brakes ineffectual so long as the switch is held closed.

Eddy current devices of the character described have a speed torque characteristic of the general shape shown at 53 in Fig. 3, the output increasing progressively over a wide speed range. Such a device, if energized sufficiently to produce a retarding force of any considerable magnitude at low vehicle speeds might become overheated and damaged by prolonged operation at high speeds. To avoid this, energization of the brake windings 28 is controlled automatically in the manner described hereinafter to flatten the speed-torque curve as indicated at 88 so that above a selected vehicle speed at which the windings 28 become energized by the generator 29 sufficiently to produce effective eddy current action, the retarding torque developed remains approximately constant and results in substantially uniform deceleration of the vehicle over the entire range of higher vehicle speeds. If desired, provision may be made for increasing the torque gradually with the vehicle speed in view of the fact that the rate of heat dissipation by the eddy current brakes increases somewhat with the speed.

To impart such a speed torque characteristic to the brakes, the current output of the generator 29 must be decreased progressively as the vehicle speed increases above the value at which the desired braking torque is attained. For this purpose, the voltage regulator 40 is adjusted automatically to impart to the generator a speed-current characteristic as shown in Fig. 3, the current first increasing sharply as indicated at 89, then decreasing quite sharply as indicated at 86 from a point 87, and finally leveling off at the higher speeds.

In the present instance, actuation of the arm 39 to obtain this characteristic is effected by a speed responsive device 60 which preferably is a clutch operating by eddy-current action and therefore without friction. As shown in Figs. 5 and 6, the clutch comprises a rotor 61 having a hub 61a composed of nonmagnetic material and supported through an anti-friction bearing 62 on an extension 63 of the shaft of the generator 29. Projecting from the hub are two rings of magnetic material axially spaced and lying against opposite sides of a flange 61b on the hub. Permanent magnetic bars 61c are pressed through the rings and the flange, and the rings are formed around their periphery with annularly spaced poles 64 having faces 65 disposed close to the internal cylindrical surface 66 of a drum 67. The latter is carried by a disk 68 which is keyed to the shaft extension. The clutch is housed within a cup-shaped casing 74 fastened by screws 75 to the generator housing and closed at its open end by a removable plate 76. Turning of the rotor 61 is resisted yieldably by a spring 69 of the torsion type having an eye 70 at one end anchored on a pin 71 which projects from the rotor through the spring and parallel to the rotor axis. The pin coacts with other similarly mounted pins 72 to support the spring, the other end 73 of which is bent outwardly and anchored by a lug 77. The latter is struck out of a disk 90 which is adjustable around a stationary flange 91 on the plate 76 and held in position by a screw tightened clamp 92. By adjusting the disk 90, any desired initial stress of the spring may be obtained.

By virtue of the permanent magnetic flux which threads the drum 67 through circuits indicated by the arrows in Fig. 5, it will be apparent that a turning moment will be applied by eddy-current action whenever the vehicle is in motion and therefore when the drum is turning. The speed-torque curve 93 of this clutch is more gradual than the curve 53 owing to the lower degree of flux saturation employed. After a predetermined low speed is attained with the vehicle traveling forwardly, the torque developed will be sufficient to overcome the initial stress of the spring 69 whereupon the rotor will turn counterclockwise as viewed in Fig. 6 until the increased stress of the spring balances the turning moment. As a result, the rotor will always occupy a position angularly spaced from the idle position, a distance corresponding to the prevailing vehicle speed. Herein the range of the rotor movement is nearly a full revolution being limited by engagement of an arm 84 with a stationary lug 94 on the flange 91. This arm is fast on a collar held by a set-screw 82 on a shaft 78 which is journaled in a bearing 79 at the center of the plate 76. The outer end of the arm is bifurcated and receives the pin 71. Clockwise movement of the rotor as the vehicle moves backwardly is prevented by engagement of the arm 84 on the other side of the lug 94 as shown in Fig. 6, this being the position occupied by the arm when the engine is idling.

To adjust output of the generator 29 according to the vehicle speed thus measured by the device 60, the shaft 78 carries the arm 39 of the rheostat 40. The resistance element 38 of the latter is mounted on an insulating body 80 which is disposed within a casing 82 and held against rotation by a bracket 81 projecting into a hole in the plate 76.

With the foregoing arrangement, the arm 84 will be swung clockwise away from the position shown in dotted outline in Fig. 6 as the forward speed of the vehicle is increased above the idle value and the rheostat 40 will be adjusted automatically with changes in the speed so that as the vehicle speed increases, the value of the resistance included in the generator field circuit will be increased and the generator output correspondingly decreased. The scale of the spring 69 and the construction of the resistance 38 are proportioned to impart a current-speed characteristic somewhat as indictaed at 86 whereby the current energizing the auxiliary brakes 9 is reduced progressively at a decreasing rate after the clutch torque is increased sufficiently to overcome the initial stress of the spring 69 as indicated at 87. In this way, the increase in braking effect due to the increased vehicle speed is substantially offset by a decrease in the excitation, and the total retarding force exerted by the auxiliary brakes 9 is maintained approximately uniform as indicated by the curve 88. By thus adjusting their retarding capacity automatically in accordance with changing service requirements, the auxiliary brakes 9 are utilized at optimum efficiency at the various vehicle speeds at which they may be brought into play by release of the accelerator pedal.

The total retarding force produced by the auxiliary brakes is, of course, determined by their number and their design. These are such as to retard the vehicle at a rate, for example, on the order of eight feet per second per second that will be comfortable to the vehicle occupants. The rate selected may, under certain load and road conditions, be excessive for safety of operation. Under such conditions it may be desirable to reduce the capacity of the auxiliary brakes which may be accomplished by adjusting the rheostat 36 so as to cut down the excitation of the windings 28.

This application is a continuation in part of my copending application Serial No. 491,468, filed June 19, 1943.

I claim as my invention:

1. A braking system for an automotive vehicle having a speed controller adjustable manually away from and toward a low speed or idle position, said system having, in combination, electric braking means, a generator for energizing said braking means when active and having a field circuit including a shunt winding, a discharge resistance, a variable resistance, a magnetic relay adapted when energized to interpose said discharge resistance in said field circuit and when deenergized to interpose said variable resistance in said circuit whereby to render the generator active, means for varying the value of said variable resistance to regulate the generator output, and means operable to deenergize said relay when said speed controller is retracted to said idle position and to energize the relay when the controller is positioned for operation of the vehicle at higher speeds.

2. A braking system for an automotive vehicle having a speed controller adjustable manually away from and toward a low speed or idle position, said system having, in combination, electric braking means, a generator for energizing said braking means when active and having a field circuit including a shunt winding, a variable resistance adapted to be interposed in said field circuit to render said generator operative to deliver current proportional to the value of the resistance, means operable automatically to decrease and increase the value of said resistance progressively as the speed of the vehicle increases and decreases respectively, a second resistance, and means operable automatically as an incident to retraction of said controller to said idle position to interpose said second resistance in said field circuit.

3. A braking system for an automotive vehicle having, in combination, electric braking means, a generator driven by the vehicle and operable, when active, to generate electric current in proportion to its speed and to energize said braking means, said generator having a shunt field winding, a circuit for said winding including a switch and a voltage regulator having a member adjustable to vary the generator output, means controlling the opening and closing of said switch to render said generator inactive and active, and means responsive to the speed of said vehicle to adjust said member and vary the generator output inversely proportional to changes in the vehicle speed.

4. A braking system for a movable vehicle having, in combination, braking means for the vehicle adapted to be energized electrically and to exert a retarding force proportional to the degree of energization, a voltage regulator controlling the excitation of said braking means and having a member selectively adjustable to vary the degree of such excitation, an eddy current clutch having a driving element driven in unison with vehicle motion and a driven element connected to said member, and means yieldably resisting motion of said driven element to vary the position of said member in proportion to changes in the vehicle speed.

5. A braking system for a movable vehicle having, in combination, braking means for the vehicle adapted to be energized electrically and to exert a retarding force proportional to the degree of energization, a voltage regulator controlling the excitation of said braking means and having a member selectively adjustable to vary the degree of such excitation, two constantly excited magnetic elements rotatably mounted on said vehicle, one being rotated in unison with the vehicle motion and producing a magnetic drag tending to rotate the other element, means yieldably resisting rotation of said latter element whereby the instantaneous position of the latter corresponds to the prevailing vehicle speed, means connecting said last mentioned element and said member to actuate the latter and decrease the excitation of said braking means progressively as the vehicle speed increases.

6. A braking system for a movable vehicle having, in combination, braking means for the vehicle adapted to be energized electrically and to exert a retarding force proportional to the degree of energization, means controlling the excitation of said braking means and having a member selectively adjustable to vary the degree of such excitation, a clutch driven in unison with vehicle motion and having magnetic elements co-acting to derive an actuating force proportional to the vehicle speed, and means for applying said actuating force to said member to position the latter variably in accordance with changes in the force.

7. A braking system for an automotive vehicle having, in combination, electric braking means, a generator driven by the vehicle and operable, when active, to generate electric current and energize said braking means, a circuit governing the action of said generator including a switch and a voltage regulator having a member adjustable to vary the generator output, means controlling the opening and closing of said switch to render said generator inactive and active, and means responsive to the speed of said vehicle to adjust said member and vary the generator output inversely proportional to changes in the vehicle speed.

8. A braking system for an automotive vehicle having, in combination, electric braking means, a generator driven by the vehicle and operable, when active, to generate electric current and energize said braking means, a circuit governing the output of said generator, and means automatically responsive to changes in the vehicle speed and operable to adjust the output of said generator so as to cause said braking means to produce a retarding torque which is substantially uniform at different vehicle speeds.

JOHN GEORGE OETZEL.